Dec. 7, 1948.  C. H. DEDERICK  2,455,568
REMOTE CONTROL FOR DISPLACEABLE OBJECTS
Filed April 21, 1943  5 Sheets-Sheet 1

INVENTOR:
CLINTON H. DEDERICK,
By Kingsland Rogers or Ezell
ATTORNEYS.

Patented Dec. 7, 1948

2,455,568

UNITED STATES PATENT OFFICE 2,455,568

REMOTE CONTROL FOR DISPLACEABLE OBJECTS

Clinton H. Dederick, Brentwood, Mo., assignor to The Emerson Electric Mfg. Company, St. Louis, Mo., a corporation of Missouri Application April 21, 1943, Serial No. 483,903

28 Claims. (Cl. 318—32)

1

This invention relates to a remote control for a displaceable object. For example, it can be used to produce movement in either of opposite directions for the device to be positioned, such as a trimmer tab on an aircraft.

The mechanism includes a control which may be preset and which operates a reversible motor in one of its directions a distance determined by the presetting of the control. Provisions are also made to prevent override of the motor beyond the normal operating limit in either direction.

An object of the invention is to provide such a control by which an object to be positioned may be positioned at a proper point and may be displaced in either direction from that point.

More specifically, an object is to provide a convenient automatic remote control for positioning trimmer tabs on aircraft.

More specific objects include the provision of a motor with a power take-off for operating the device to be positioned, and with a compact and accurately operating form of limit control to prevent the motor from moving the device beyond its normal maximum limits.

A further object is to provide a combination of such a motor with a control which may be preset to determine the extent of movement of the motor and, consequently, of the device to be displaced whereby the motor may operate to such extent and stop.

A further object is the provision of a control of this type in combination with a motor means, in which the mechanism is provided with full voltage throughout the entire range of operation.

A further object is to provide a control and motor means of this type, in which constant torque is obtained throughout the operation.

A further object is to provide a combination having connections causing the motor means to avoid override, and specifically to cause the motor means to have a dynamic braking effect.

An object is to provide a control and motor that may graduate to a selectable fine degree, and which will operate accurately in such fine degree.

In the drawings, the motor and control are shown in two separate units, although they may be joined together, if desired.

Referring to the drawings.

2

The mechanism includes a main motor housing 30, in which there is disposed a reversible electrical motor of one of the familiar types, preferably shunt wound to provide dynamic braking. To the housing 30 is secured a power take-off extension or gear case 31, from the side of which there extends a drive member 32 that is reciprocated by mechanism operated by the motor.

Figure 5:
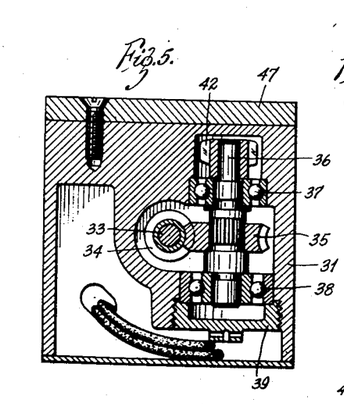
Fig. 5 is a transverse section through part of the power take-off on the line 5—5 of Fig. 1.
Figures 6, 7, 12, 13, 14, 15:
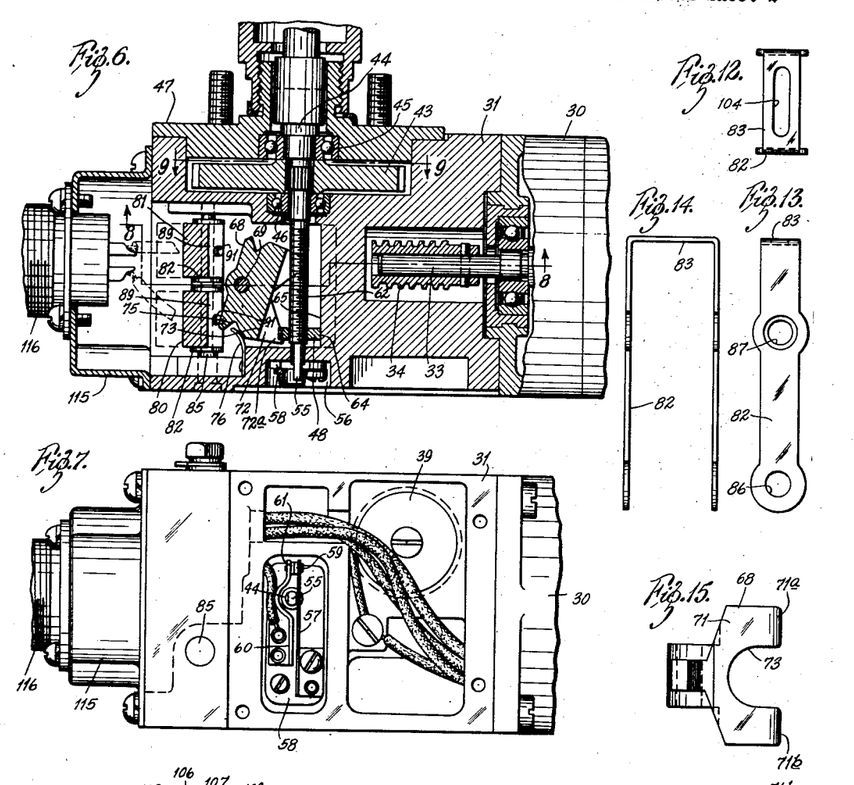
Fig. 6 (Sheet 2) is a longitudinal section on the line 6—6 of Fig. 1, part being eliminated.
Fig. 7 is a view from the bottom side of Fig. 2 with the cover removed.
Fig. 12 (Sheet 2) is an end view of the carrier for the limit switch.
Fig. 13 is a side view of that carrier.
Fig. 14 is a bottom view of the carrier.
Fig. 15 is an end view of the tripping actuator for the limit switch.
Figure 8:
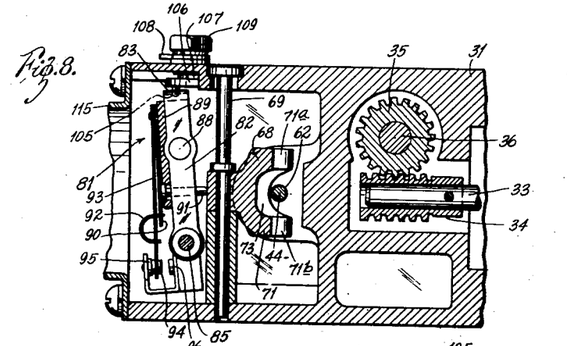
Fig. 8 is a longitudinal sectional view taken on the line 8—8 substantially through the middle of Fig. 6.

Referring to Figs. 5, 6, and 8, the motor drives a shaft 33 to which is secured a worm 34. This worm meshes with and drives a gear 35 fixed to a stud shaft 36. The shaft 36 is rotatably mounted in bearings 37 and 38 in the box 31. A suitable cap 39 is provided to give access to this shaft and to the attached mechanism.

Figure 1:
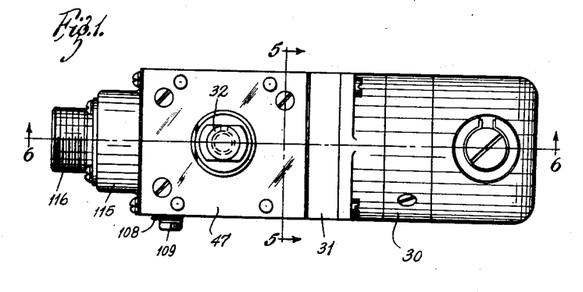
Fig. 1 (Sheet 1) is a side elevation of the motor unit looking toward the power outlet thereof.
Figures 9, 10:
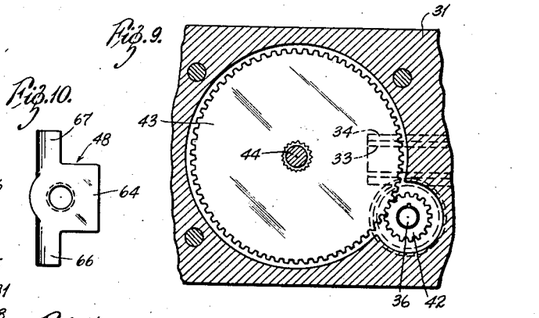
Fig. 9 (Sheet 1) is a section taken on the line 9—9 horizontally across the top part of Fig. 6.
Fig. 10 is a view of an actuating rider for the limit switch in the motor housing.

At one end of the shaft 36, there is secured a gear 42 (Figs. 5 and 9) that meshes with a larger gear 43, which is mounted upon a shaft 44 supported at its smaller end in the extension 31, and at its other end supported by bearings 45 and 46, respectively, in a cover plate 47 bolted (Fig. 1) to the extension, and in the extension itself. The shaft 44 extends through the plate 47.

It will be seen from the foregoing that rotation of the motor will cause rotation of the shaft 44, but that the latter will rotate at a much lower speed than does the motor.

Figure 29:
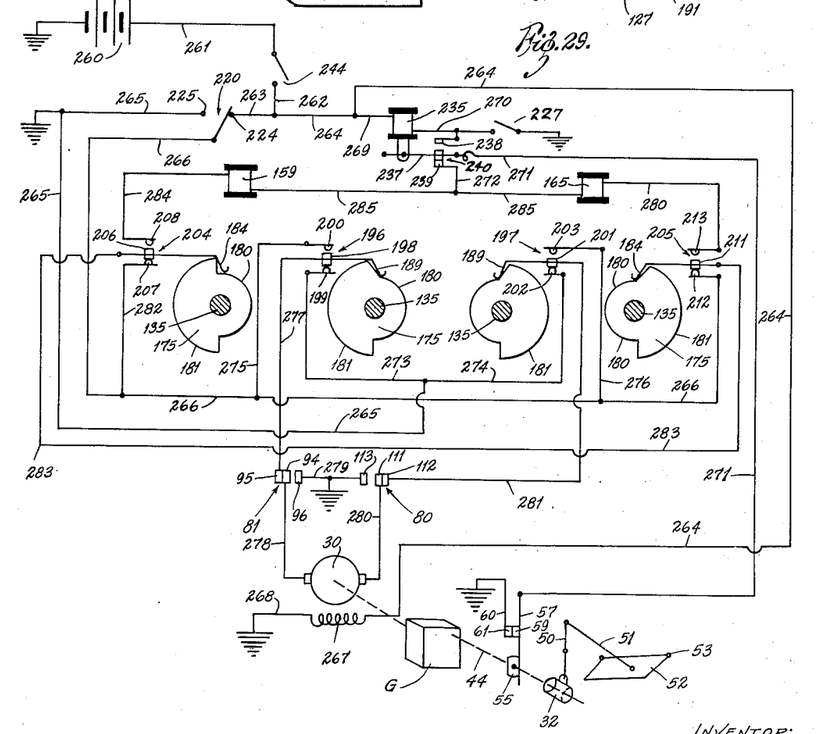
Fig. 29 is a wiring diagram of the mechanism.

As shown in Fig. 29, the motor is indicated at 30, and the gearing generally indicated at G. The shaft 44 is shown projecting from the gear box, and it is threaded through a nut 32 which is held against rotation, so that the nut 32 is reciprocated along the shaft 44 upon rotation of that shaft. This is simply the familiar jack screw arrangement. The nut operates through linkage 50 and 51 to a trimmer tab 52 pivoted at one edge 53, to the wing of an airplane. It will be seen that the trimmer tab is positioned upon rotation of the motor shaft, and that its degree of angularity depends upon the position of the nut 32.

The shaft 44 at its smaller end operates a make-and-break switch (Figs. 6 and 7). To this end, the shaft has a portion 55 that extends into a recess 56 formed in the extension 31. The portion 55 of the shaft is flatted on two sides and extends, as shown in Fig. 7, adjacent a spring switch blade 57. The blade 57 is mounted as shown upon the insulating plate 58 in the recess 56, and is grounded. The blade 57, by its spring action, normally urges its free or upper end in Fig. 7 toward the center of the shaft 44. Consequently, the blade 57 will normally engage the flats of the portion 55 of the shaft, and will be displaced to the right (Fig. 7) each time the shaft rotates one of the flats away from the blade.

A second switch blade 60 is likewise secured to the plate 58 and normally insulated from the blade 57. The blade 60 has a portion extending around the shaft and presents a contact 61 which is engaged by the contact 59 whenever the blade 57 engages one of the flats on the shaft.

Figure 11:
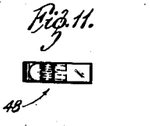
Fig. 11 is an end view of that rider.

In its intermediate portion, the shaft 44 is threaded at 62. The T-shaped nut or rider 48 (appearing in detail in Figs. 10 and 11 of Sheet 1) engages over the threaded portion 62. The stem part 64 of the member 48 is flat and engages against an inner wall 65 on the extension 31. This prevents the rider 48 from rotating upon rotation of the shaft, but permits it to move axially upon such rotation. The member 48 has two wings 66 and 67.

A tripping member 68 is pivoted upon a shaft 69 secured to the extension 31. This member appears in section in Figs. 6 and 8 and in detail in Figs. 15 and 16 (all on Sheet 2).

Figure 16:
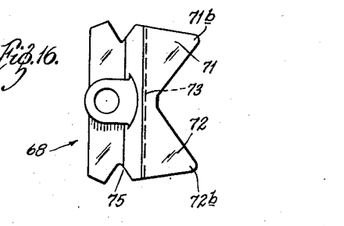
Fig. 16 is a side view thereof.

The tripping member 68 is divided by an angular cut-out into two ends 71 and 72. Transversely, it is also divided by an arcuate cut-out 73 which, as shown in Fig. 6, may accommodate the shaft 44. This cut-out 73 divides the extensions 71 and 72 each into two parts. The portion 71 has the legs 71a and 71b. The portion 72 has the legs 72a (Fig. 6) and 72b (Fig. 16).

The arms 66 and 67 on the T-shaped rider 48 will engage the arms 71a and 71b when the rider is displaced to an extreme upper position in Fig. 6, and will engage the arms 72a and 72b as it approaches the extreme lower position in Fig. 6. At intermediate positions, the arms 66 and 67 will not engage either set of legs; and, owing to the sloping edges of the legs, the displacement of the tripping member 68 will increase as the movement of the rider 48 toward either pair of legs increases.

The member 68 may be provided with a notch 75. A small leaf spring 76 is in such case secured to the box 31 and engaged in this notch 75. This leaf spring yieldably maintains the tilting member 68 in a neutral position, so that its axis is parallel to the axis of the shaft 44. In this neutral position, the nut 48 may move back and forth through a considerable range without tilting the member 68. Beyond these limitations, it will begin to displace the member 68 by contact with the sloping surfaces thereon and after a certain degree of such tilting, will operate the limit switch mechanism, now to be described.

The limit switch mechanism, actuated by the tilting member 68, comprises two limit switches 80 and 81. These limit switches are the same in construction, so only one need be described. The limit switch 81 appears in Fig. 8.

Each switch is provided with a U-shaped bracket 82 (Figs. 8, 12, 13, 14). This bracket 82 comprises two legs joined by a bight portion 83. A pivot shaft 85 is secured in the extension 31 and passes through openings 86 in the ends of the legs of the member 82. It also passes through the housing of the limit switch.

Legs of the member 82 are also provided with pairs of openings 87 to receive a rivet 88 through the limit switch housing. The pivot 85 and the rivet 88 keep the switch firmly held in the bracket 82. The limit switch unit 89 has a spring blade 90 pressing against a button 91 and urging it toward the member 68. The blade 90 is also connected at its free end, by an overcenter spring 92, with a spring switch blade 93. The blade 93 has a double contact 94 engageable with either a fixed contact 95 or a fixed contact 96. When the button 91 is free, the spring 90 will move toward it, causing the overcenter spring 92 to move the switch blade 93 to close its contact 94 with the fixed contact 95. Upon pressing of the button by the member 68, the spring 90 will move out, displacing the spring 92 overcenter, and causing the blade 93 to shift its contact 94 to engage with the contact 96.

Figure 2:
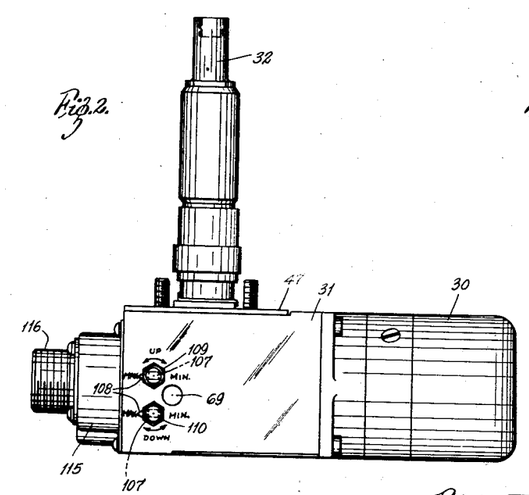
Fig. 2 is a side elevation of the lower side shown in Fig. 1.
Figure 3:
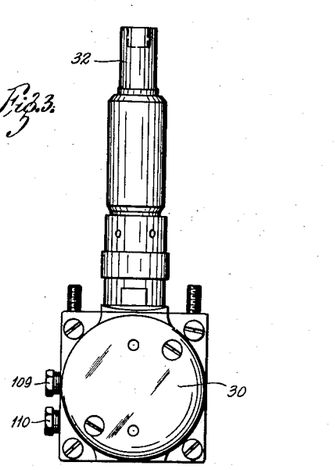
Fig. 3 is an end elevation from the right-hand end in Figs. 1 and 2.
Figure 4:
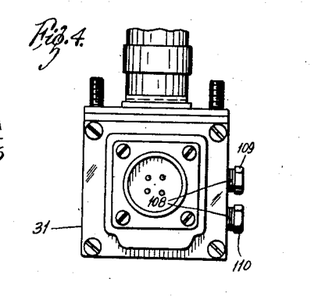
Fig. 4 is an end elevation from the left-hand end of Figs. 1 and 2.
Figure 17:
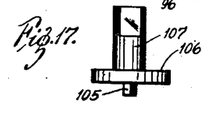
Fig. 17 is a view of one of the adjusting elements for the limit switch.
Figure 18:
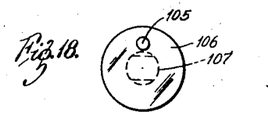
Fig. 18 is a bottom view thereof.

The U-shaped member 82 has a slot 104 on the bight portion 83 thereof. This slot is engageable by an eccentric pin 105 on a disc 106 (Figs. 8, 17, and 18, Sheet 2) integral with a short shaft 107. This shaft is secured in the wall of the extension 31 and has mounted thereon a pointer 108 and a hexagonal head 109 by means of which the pointer may be turned, and with it the pin 105. The pointer cooperates with indicia (Fig. 2) on the member 31.

By turning the head 109, the pin 105, acting in the slot 104, displaces the U-shaped member 82 about the pin 105 and causes the button 91 to approach toward or recede from the member 68. This will adjust the point of travel of the member 68 at which the limit switch will be tripped.

A similar operating head 110 with a pointer and indicia are provided for the limit switch 80. By means of these two members 109 and 110, the range of free operation of the nut 64 is controlled. In turn, the scope of operation of the operating mechanism 52 is controlled.

The limit switch 80 also has a similar movable contact 111, normally engaging a fixed contact 112, but displaceable to a fixed contact 113.

A cap 115 covers the end of the member 31 and receives a connection plug 116 by which the wiring may be brought into the mechanism.

The control portion of this mechanism is shown particularly on Sheets 3, 4, and 5. A panel 125 comprises a wall to which the control may be attached. The plate 125 is preferably of insulative material. It has an opening to receive a flanged member 126 that is circular and to which are secured a plurality of rods 127 by means of which the elements of the control are supported. The member 126 has a cylindrical front plate 128 having a pointer 129 on the edge thereof.

The several rods 127 support a forward disc-like plate 130, a cut-away disc-like plate 131, a back-center plate 132, and a back plate 133.

The control mechanism operates from a center tubular shaft 135 that is supported directly or indirectly in the transverse plates. This shaft 135 is adapted to be manually displaced from a neutral position and automatically returned to that neutral position. In this operation, the shaft is axially displaced, a dial is turned, as will appear, and likewise a pointer is turned.

Figure 22:
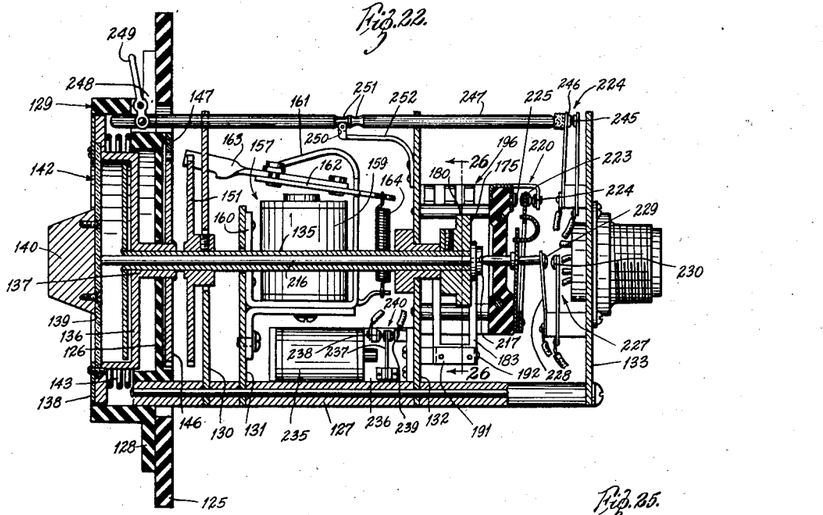
Fig. 22 (Sheet 5) is a vertical section through the control, medial to the back plate, taken on the line 22—22 of Fig. 20.

To accomplish the foregoing, a cup-like member 136 has a center bearing portion 137 supporting the shaft 135 for rotatable movement, the portion 137 in turn, bearing in an opening with the plate 126 for its own rotary and axial movement. This cup-like member is enclosed by a transparent plastic sheet 139 upon which is mounted a knob 140. It will be seen that by pressing the knob to the right in Fig. 22, the cup-like member 136 will be displaced to the right, and that by turning the knob, the cup-like member may be turned relative to the shaft and the member 126. The cup-like member has on its outer surface a dial 138 with which the previously mentioned pointer 129 registers.

Within the cup-like member there is a pointer 142 that is secured to the shaft 135 and rotates therewith. This pointer 142 may comprise a mark on a disc.

Inward pressure on the knob is opposed by a spring 143 acting between a flange on a cup-like member 136 and the end of the cylindrical portion 126. This spring normally maintains the cup member 136 outward.

Figure 23:
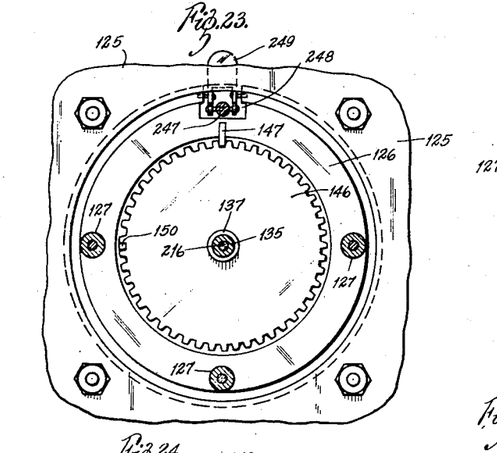
Fig. 23 is a vertical transverse section, taken on the line 23—23 at the left of Fig. 21.
Figure 24:
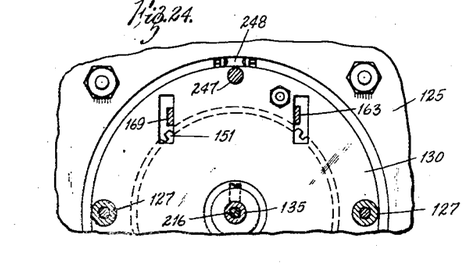
Fig. 24 is a section on the line 24—24 at the left of Fig. 21.
Figure 25:
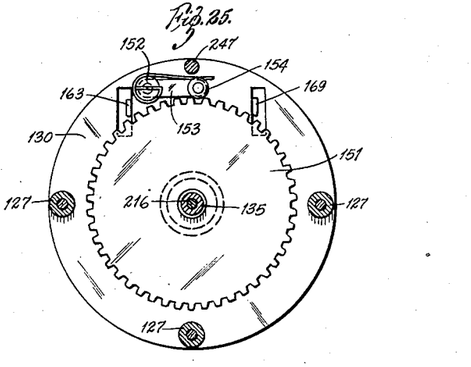
Fig. 25 is a section on the same line as Fig. 23, looking in the opposite direction as indicated by the arrows 25—25 of Fig. 21.

As appears, the bearing portion 137 of the member 136 extends through the plate 126. On the inner end of the bearing portion 137, there is secured a toothed wheel 146 (Fig. 23). The toothed wheel 146 is normally held toward the plate 126 by the spring 143. In this position, a restraining member 147, secured to the member 126 engages between two of the teeth and prevents rotation of the member 146 and the cup-like member 136 to which it is attached.

Figures 20, 21, 27:
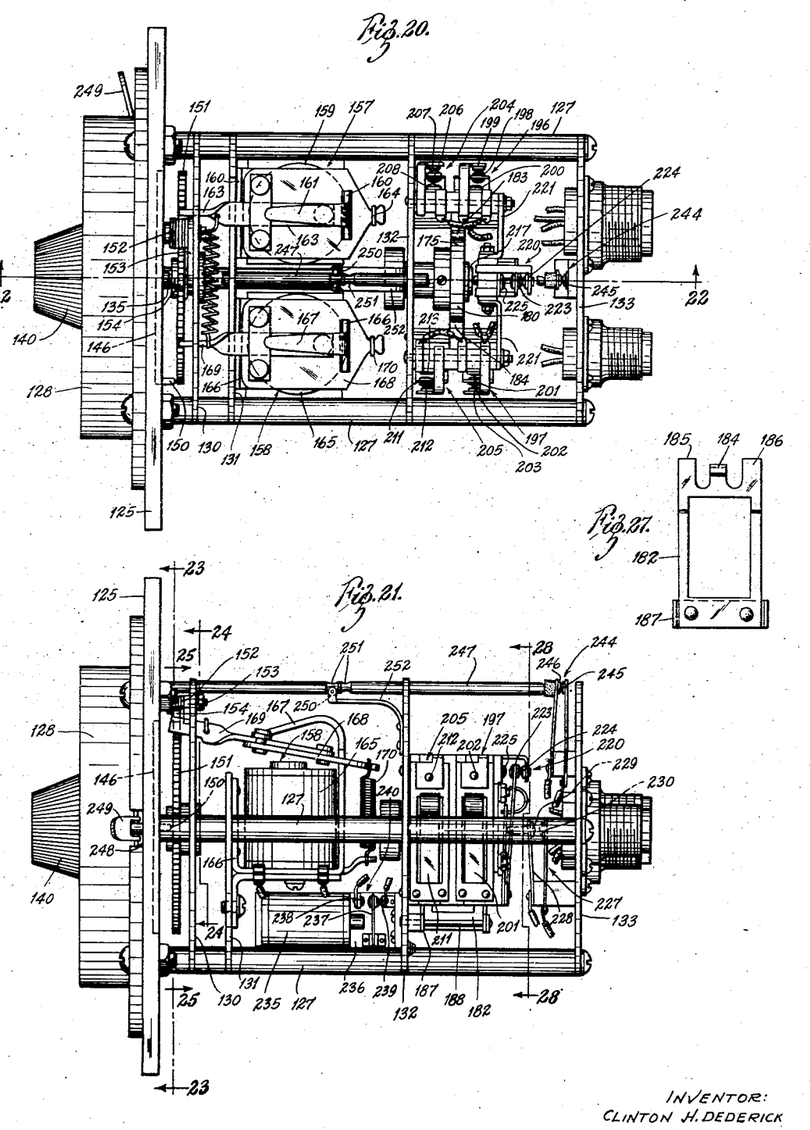
Fig. 20 (Sheet 4) is a plan view of the control.
Fig. 21 is a side view of the control.
Fig. 27 (Sheet 4) is a view of a cam follower and switch actuator.

The wheel 146 also has a tooth 150 extending from its face (see the lower left portion of Fig. 20 and the nine-o'clock position on Fig. 23). This tooth 150 is adapted to be brought between adjacent teeth of a toothed wheel 151 that is fixed to the shaft 135. Such engagement takes place when the knob 140 is depressed to move the toothed member 146 inwardly until it is free of the restraining member 147 and until the toothed member 150 makes its engagement with the member 151. Thereupon, rotation of the knob 140 will rotate the cup-shaped member 136, the wheels 146 and 151, to displace the shaft 135 the distance indicated by the pointer 129 against the dial 138. When the shaft is rotated the desired distance, the knob 140 is released, whereupon the member 146 and the cup member 136 return to their outward positions in which they are retained by engagement of the member 147 with the toothed member 146.

During the setting operation also, the pointer 142 will have followed the joint displacement of the cup-shaped member 136 and the shaft 135. From an initial zero starting position on the dial, the pointer 142 will not be displaced with respect to the dial when the zero position of the dial itself is angularly moved. However, as will appear, a return of the shaft 135 to its neutral position will carry the pointer with it without moving the dial, so that the pointer indicates at all times the position of the shaft 135.

A spring type retaining means 152 comprising a spring-pressed arm 153 having a roller 154 thereon for engagement between adjacent teeth to the member 151 is secured to the supporting plate 130. This prevents fortuitous displacement of the shaft.

The toothed wheel 151 is part of a stepping means to return the shaft to its neutral position. This stepping means comprises a counterclockwise stepping magnet 157 and a clockwise stepping magnet 158. When employed on a trimmer tab, the magnet 157 will ultimately control turning of the trimmer tab up and the magnet 158 will control turning of the trimmer down.

The magnets are similar. The magnet 157 has a coil 159 supported on a bracket 160 secured to the supporting plate 131. The bracket 160 in turn has an overhanging extension 161 that limits upward movement of an armature member 162 pivoted onto the bracket 160. This armature member carries an extension 163 that is adapted to be brought down to engage a tooth of the wheel 151 and move the wheel the space of one tooth for each energization of the coil 159. This action of the armature 162 is opposed by a spring 164 which maintains the extension 163 away from the wheel 151 whenever the coil is deenergized.

Similarly, the magnet 158 has a coil 165 supported by a similar bracket 166 having an extension 167, an armature member 168, an extension 169, and a return spring 170. The extension 169 engages the wheel 151 on the side opposite the extension 163 so that it may rotate the wheel in the opposite direction the distance of one tooth for each energization of the coil.

The operation of the motor as well as that of the coils 159 and 165 is controlled by a cam 175 that is fixed to the shaft 135.

The cam 175 has opposite rises 178 and 179 thereon (Fig. 6). Between these rises the cam comprises a low edge 180 and a high edge 181.

A combination switch actuator and cam follower 182 is actuated by one side of the cam, and a similar follower and actuator 183 is actuated by the other side of the cam. These actuators are shown more in detail in Figs. 26 and 27. They are the same in construction. Describing the member 182, it includes a follower portion 184, struck back to engage the cam, and two switch actuating portions 185 and 186. The member 182 is likewise attached at its bottom to a U-shaped bracket 187 through the ears of which extends a pivot shaft 188.

In like manner, the member 183 has a follower portion 189, two switch actuating portions 190, and is secured to a bracket 191, the ears of which receive a pivot shaft 192. As appears at the bottom of the right center of Figs. 21 and 22, the pivot shafts 188 and 192 are secured to the plate 132.

Figure 19:
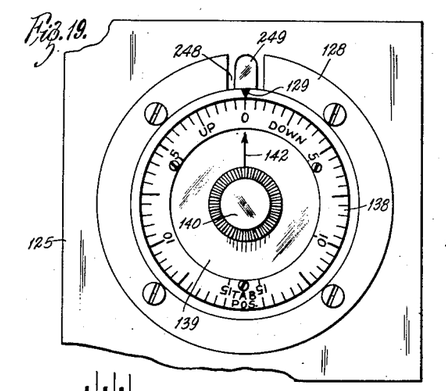
Fig. 19 (Sheet 3) is a view of the dial of the control.
Figure 26:
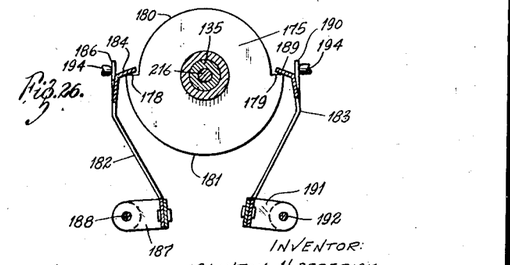
Fig. 26 is a section on the line 26—26 toward the right of Fig. 22.

From the foregoing, it will be seen that if the cam 175 is rotated clockwise in Fig. 26, which is counterclockwise on the dial in Fig. 19, the rise 178 will displace the member 182; whereas, the member 183 will not be displaced as its follower will remain on the low edge 180. The cam is capable of nearly 180° of movement, in each direction. It will also be seen that such displacement of the member 182 will move the upper end of said member outwardly from the shaft 135. Counterclockwise rotation of the cam will similarly displace the follower 183.

The switch actuating portions of the members 182 and 183 actuate four snap-action single-pole double-throw switches. These switches are the same in construction as the limit switches 81 and 82, and, therefore, need not be described in detail. Suffice it to say, that as appears in Fig. 26, each such switch has a button 194 engaged by one of the switch actuating extensions of the members 182 and 183. Such buttons are shown also in Fig. 28, and in these figures, it will be seen that these various switches all include a spring blade acting against the button, a bowed over-center spring, and a spring contact blade, having a double contact on it, alternately engageable with two fixed contacts.

Figure 28:
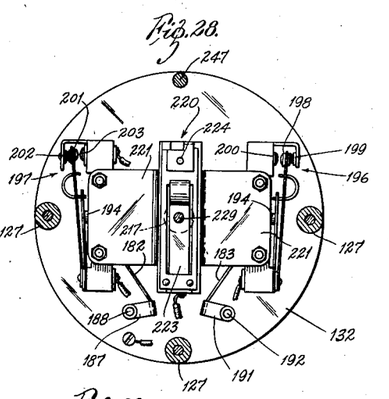
Fig. 28 is a section on the line 28—28 at the right of Fig. 21.

In Figs. 20 and 28 the rearward switches 196 and 197 appear. The switch 196 has a double-throw contact 198, normally engaged with a fixed contact 199, but moved into engagement with a fixed contact 200 upon operation of the cam 175 to displace the follower member 182.

The switch 197 in similar fashion comprises the double-throw contact 201, normally engaging a fixed contact 202, but movable against the fixed contact 203 when the cam 175 is moved to displace the follower member 183.

The forward switches are identical with the rearward ones, and comprise switches 204 and 205, the former also operated off the follower 182 and having the double-throw contact 206 normally engaging the fixed contact 207, but displaceable against a fixed contact 208 upon movement of the cam 175 to displace the follower 182. The other switch 205 includes the double-throw contact 211 normally engaging the fixed contact 212, but displaceable against the fixed contact 213 upon rotation of the cam 175 to displace the follower member 183.

Thus it will be seen that the switches 196 and 204 are operated by the follower 182, and the switches 197 and 205 are operated by the follower 183.

The shaft 135 is hollow. Through it runs a rod 216 (Fig. 22) which is axially movable within it. This rod at its outer end may engage against the crystal 139 behind the knob 140. At its opposite end, the rod 216 has a head 217 for actuating an additional single-pole double-throw switch, generally indicated at 220. This switch is attached by brackets 221 to the supports holding the several switches 196, etc., to the plate 132. The switch 220 is similar to those previously mentioned, being an over-center switch operated by a button that may be engaged by the head 217. This button in turn operates a double-throw contact blade having its double contact 223 normally against a fixed contact 224, but displaceable against a fixed contact 225 whenever the rod 216 is moved inwardly, which will occur whenever the knob 140 is displaced inwardly. The switch will be released to its starting position whenever the knob is released.

A further switch generally indicated at 227, is secured to the back partition 133. This switch comprises a spring blade 228 having a contact 229 that is brought against a contact 230 fixed to the partition 133 whenever the rod 216 is moved inwardly. As will be seen, an insulating button extends from the blade 228 against the spring blade of the switch 220. The switch 227 need not be snap-action, and it will return to open position upon release of the knob 140.

An additional coil 235 is supported upon a bracket 236 secured to the partition 132. The coil 235 actuates an armature comprising a switch blade 237 to bring it against a contact 238, or to release it against a contact 239, these elements comprising a switch 240. As will later appear, the coil 235 may be energized through the switch 227.

A main switch 244 for the mechanism is mounted on the back wall 133. It includes a contact 245 mounted on a spring blade and a contact 246 mounted on another spring blade. These spring blades are secured to the back partition 133. The switch 244 is adapted to be actuated by a rod 247 slidably supported in openings in the top of the partitions 130 and 132. This rod extends into a cut-out portion 248 in the member 126. At its forward end, it projects to immediately behind the dial member 136, and is pivotally connected to a lever button 249, which lever is pivoted to the flange 128. When the upper end of the lever 249 is depressed toward the back of the instrument, the rod 247 will be shifted forwardly to permit the switch 244 to open. Opposite displacement of the lever will close the switch. Also depression of the knob 140 will close the switch by engagement of the dial member 136 with the end of the rod 247. The switch is maintained in either position by the engagement of a spring supported roller 250 in either of two notches 251 on the rod 247. The roller 250 is supported by its spring 252 onto the partition 132.

In Fig. 29 is shown the wiring diagram demonstrating the manner in which the control and motor are connected. In this diagram, the cam operated switches have been separated, and the cam indicated four times, although, obviously, it is more economical to use the single cam shown in the other drawing. Also the cam rises have been exaggerated for clarity of the drawing.

In Fig. 28, the battery, or other source of power, is shown at 260. One side of the battery is grounded, and the other side leads by a line 261 to the switch 244, which, it will be remembered, is the one actuated by the lever 249 at the top of the control panel. From the switch 244, a line 262 extends to a junction whence it divides into a line 263 and a line 264. The line 263 extends to the contact 224 of the switch 220, this being the double-throw switch actuated by the rod 216 when the knob 140 is depressed. The other terminal 225 of the switch 220 is connected by a line 265 to ground. This line 265 likewise is extended into the motor switches as will be described. The blade of the switch 220, with its double contact, is connected by a line 266 into the motor switches and the stepping coil switches, as will appear.

Returning to the line 264, this line extends through a shunt winding 267 of the motor, and thence by a line 268 is grounded. A branch 269 (top of Fig. 28) from the line 264 extends through the coil 235, which, it will be remembered, is disposed at the bottom of the control. The other lead 270 from the coil 235 extends to the switch 227, which, it will be remembered, is closed upon depression of the knob and displacement of the rod 216. The other side of the switch 227 is grounded.

The line 270, likewise, is connected to the contact 238 of the switch 240. The movable blade of this switch is permanently connected by a line 271 to the switch 57, which is in turn grounded. The other contact 239 of this switch is connected by a line 272 with the stepping magnets, as will appear.

The shaft 135 upon rotation displaces the cam to move the four cam switches. Assuming that Fig. 28 is taken from the front of the control, the left-hand switch is 204 and the second 196. The inner right-hand switch is 197 and the outer right-hand switch is 205.

The line 265 leading from the contact 225 of the switch 220 in the upper left of Fig. 28, branches into a line 273 connected to the contact 199 of the switch 196, and into a line 274 connected with the contact 202 of the switch 197. The other contact 200 of the switch 196 is connected by a line 275 with the line 266, and the other contact 203 of the switch 197 is connected by a line 276 with the same line 266.

The double-throw contact 198 of the switch 196 is connected by a line 277 with the normally closed contact 95 of the limit switch 81 in the motor housing. The double-throw contact 94 of this limit switch is connected by a line 278 into the rotor of the motor 30. The other contact 96 of the limit switch 81 is connected by a line 279 to ground and to the contact 113 of the other limit switch 80. The movable contact 111 of the limit switch 80 is connected by a line 280 of the rotor of the motor 30. The normally closed contact 112 of the limit switch 80 is connected by a line 281 to the double-throw contact 201 of the motor cam switch 197.

The power line 266 is likewise connected into the stepping magnet switches 204 and 205. A line 282 connects the line 266 with the contact 207 of the switch 204. The movable contact 206 of the switch 204 is connected by a line 283 with the movable contact 211 of the switch 205. The other contact 208 of the switch 204 is connected by a line 284 to the coil 159. The other lead 285 from the coil 159 is connected both to the line 272 and to the coil 165. The coil 165 in turn is also connected by a line 280 with the contact 213 of the switch 205. The contact 212 of the switch 205 is directly connected to the line 249.

*Operation*

The control at the start has the shaft 135 in neutral position and the dial registering zero against the pointers 129 and 142. In this position, the knob 140 is released so that the switch 220 is closed against the contact 224. The switch 227 is open and switch 244 is normally open. The cam switches are in the positions shown in Fig. 28, as well as in the other figures. The switch 240 is in the position shown. The switch 57 may be opened or closed depending upon the more or less fortuitous position of the motor 30, and the limit switches 80 and 81 are in the positions shown in Fig. 29. In this case, too, the mechanism to be actuated will be in a neutral position, which, in the case of the trimmer tab, means at zero angularity relative to the airfoil.

The first operation is to depress the knob 140. This action will inter alia, close the main switch 244 by engagement of the dial members 136 with the rod 247. The switch 244 controls the admission of power from the battery 260 to the whole system. Immediately upon its closing, it brings power to the switch 220, the coil 235, and the field winding 267. As long as the rotor of the motor is out of circuit, the field winding 267 acts as a dynamic brake to prevent rotation. The motor circuits depend upon the introduction of power from the movable contact 223 of the switch 220 through the line 266, as will be described in more detail. The same may be said for the stepping magnet coils 158 and 159. Consequently, the shifting of the switch 220 upon depressing of the knob 140 to break the contact 224 and to make the contact 225 cuts the motor and the stepping magnets away from power, and this condition is maintained so long as the knob is depressed. Since the knob must be depressed to effect rotation of the cams, and to rotate the dial, this breaking of these circuits is held until the dial is set to its desired position. Thereafter, upon release of the knob 140, the switch 220 will shift back to admit power to the motor and stepping magnet circuits in so far as they are closed otherwise. However, the main switch 244 will be held closed by the detent 250.

The rotation of the shaft 135 will displace two of the cam switches and leave the other two in their original positions. Assuming that the shaft is rotated clockwise in Figs. 19 and 29, this will shift the switches 204 and 196 so that the former closes with the contact 208 and the latter closes with the contact 200.

When the switch 204 thus shifts, at the instant the switch 220 is returned to initial position, the line 266 is connected to the battery. Owing to the fact that the switch 205 is in neutral position, the battery current is carried by the line 266 through the contacts 212 and 211 of the switch 205 to the line 283. Thence, it continues through the contacts 206 and 208 of the switch 204 and by the line 284 through the coil 159. From this coil, it continues by the line 285 to the line 272 and the contact 239 of the relay switch 240.

If the motor had in a previous operation stopped with the switch 57 closed, this stepping magnet circuit would be completed immediately upon release of the knob 140, were it not for the presence of the relay switch 240. It is, of course, the objective of this mechanism that the motor shall make a predetermined number of revolutions for each stepping action of the stepping magnets. Hence, were it not for the presence of the relay switch 240, the stepping magnet 159 might energize to step the shaft back one unit of distance, the instant the switch 220 is returned, and prior to any rotation of the motor itself.

As heretofore noted, the switch 227 is closed when the knob 140 is depressed, completing a circuit through the coil 235 and the switch 227. Such circuit through the coil 235 will lift the contact 237 from the contact 239 to the contact 238. This holds open the circuit heretofore described through the stepping magnet 159, and makes a holding circuit for the coil 235 in parallel with the switch 227, so long as the switch 57 is closed. This holding circuit will then remain closed after release of the knob and until the switch 57 is opened. When this switch 57 subsequently opens, the holding circuit will break, deenergizing the coil 235 and releasing the armature to complete the circuit from the stepping magnet 159 through the contacts 236 and 237, the line 271 to the switch 57. When the switch 57 later closes, the circuit will be completed to ground for the instant of closure of the switch 57. This will energize the coil 159 to bring the extension 163 down against the wheel 151 and displace the same the distance of one notch, this displacement returning the shaft 135 a corresponding distance toward neutral position.

The foregoing will show that the stepping notch cannot step the shaft back one notch before the motor starts. Actually, the normal stopping position of the motor will have the switch 57 closed as the final stepping action of the stepping magnet will open the cam switches practically simultaneously with the final closing of the switch 57 and this deenergization of the motor circuit, to be described, will leave the field winding in circuit as a dynamic brake.

From the foregoing, it will be seen that when the knob 140 is depressed, and the shaft turned, a circuit will be provided through the stepping magnet 159 only after the motor has started and has rotated a distance with the switch 57 opened, and has subsequently closed the same. Consequently, operation of the stepping magnets depends upon rotation of the motor.

As previously noted, as soon as the switch 220 is released by release of the knob, the line 266 is connected to the battery. Rotation of the knob in the direction assumed, operates the cam switch 196 to close the contact 198 with the contact 200, but does not change the switch 197. This shifting of the switch 196 sends power through the motor rotor in one direction, it going from line 266 through the line 275, the contacts 200 and 198, and the line 277 to the limit switch 81. Normally, both of the limit switches 80 and 81 will rest in the positions of Fig. 29. Consequently, the power from the line 277 passes through the limit switch 81, the rotor 30, and the limit switch 80. From the latter, it flows through the line 281 and the switch 197 by contacts 201 and 202, line 274 to the line 265, which is permanently connected to ground, thus completing the circuit. This will cause the motor 30 to rotate in one direction. This rotation will operate the switch 57 in accordance with the number of flats on the shaft portion 55, and it will also operate the jack screw member 32 in one direction along the shaft. This displacement of the member 32 will move the tab 52 in one direction about its axis.

When the knob 140 rotates, it rotates the dial 138, and the angular distance, measured in terms of ultimate displacement of the tab 52, is shown by the final graduation on the dial that registers with the pointer 129. The pointer 142, having been displaced with the shaft 135, indicates the actual position of the tab at that time, as the pointer 142 maintains its original relationship to the dial. Thus, if the knob be turned clockwise in Fig. 19, the pointer 142 will also move clockwise to stay with the zero index on the dial. The relative movement of the pointer 129 relative to the dial is counterclockwise.

Thereafter, each time the switch 57 closes, a current impulse will flow through the stepping magnet 159. This will cause return of the shaft toward neutral position in the amount of one tooth. The number of teeth here provided is such that this distance represents one half a degree of angular displacement of the trimmer tab. Furthermore, the pointer 142 being fixed to the shaft 135 will return toward neutral position a corresponding amount. Since the zero position on the dial has been displaced clockwise, the counterclockwise return movement of the pointer 142 will cause this pointer to sweep across the dial counterclockwise so that it indicates on the dial at all times the actual position of the tab.

When finally the shaft is returned to neutral position, so that it returns its cam switches 196 and 204 to the position of Fig. 28, the motor circuit and the stepping magnet circuit will be broken. The motor will stop at once, because the shunt winding 251 is left in circuit and operates as a dynamic brake. Therefore, the pointer 142, having returned to its vertical position, will indicate on the dial, which remains displaced, that the trimmer tab has been moved the distance originally set by displacement of the dial with respect to the pointer 129.

The operation in the reverse direction is exactly symmetrical with the operation just described. It will be noted that when the switch 197 is shifted to close the contact 203, power runs from the line 266, through the line 276, switch 197, line 281, limit switch 80, motor 30, limit switch 81, line 277, switch 196, and line 273 to the grounded line 265. This produces flow through the rotor in the direction opposite to that previously described, so that the motor operates in the other direction.

When the motor rotates to such an amount that one of the limit switches is opened and shifted to a ground connection, the result is that the motor circuit is broken on the power side of the rotor for the particular direction of rotation, but for rotation in the other direction, is grounded without having to pass through the motor cam switch which has been shifted.

Thus, in the original motor circuit, which ran from the line 266 through the line 275 to the switch 196, when the limit swtich 81 is opened by excessive rotation of the motor in the direction produced by this circuit, power never reaches the rotor. Also both sides of the rotor are grounded, the rotor circuit being broken from the power line, but extending from the ground line 279 through contacts 96 and 94 of the limit switch 81, through the rotor, through the contacts 111 and 112 of the limit switch 80, by line 281, to contacts 201 and 202 of the switch 197 and thence by lines 274 and 265 to ground. This direct short circuit of the rotor circuit with the shunt winding remaining in circuit causes the motor to stop at once under the dynamic braking effect. Necessarily, the control also will stop.

When this occurs the dial 138 will be set to register some high calibration with the pointer 129. The pointer 142 will have moved counterclockwise in sweeping toward such calibration until it has approached the same, but it will be stopped prior to attaining the value. Thus, the shaft 135 is not likely to be very far from neutral position.

To illustrate, assume that the dial 138 has been turned until the pointer 129 registered with 15° "up." The pointer 142 was stopped by the limit switch when it registered 13° up. The shaft 135 will be 2° out of neutral position.

If, then, the knob be depressed and the dial rotated counterclockwise until 13° registers with the pointer 129, such action will move the shaft 135 back 2° thus bringing it to neutral position. The pointer 142 will continue to register the 13° as it is displaced with the shaft. The whole mechanism will remain stopped in this position determined by the limit switch.

If the limit switch opened at an instant when the switch 57 was closed, one of the stepping magnets would have been energized. However, the stoppage of movement of the pointer 142 away from its neutral position would indicate an abnormal condition to the operator.

Such continued energization of one of the stepping coils would hold its extension against the teeth of the wheel 151 and prevent rotation thereof. However, when the knob is depressed for resetting the control, the switch 227 is closed, connecting the relay coil 225 to ground and opening the switch 237 to release the stepping coil and thus to permit free rotation of the dial. Of course, if the limit switch has acted at some point ahead of the maximum dial position, in either direction, any further displacement of the dial in that direction will have no effect.

The only way the motor can be restarted is to displace the dial in the opposite direction any distance, returning toward zero or beyond. In short, the cam switches must be returned to neutral position and beyond. As heretofore noted, merely to return them to neutral position, so that both pointers 129 and 142 register the actual setting of the tab on the dial, as determined by the limit switch, will not change the tab setting at all. If, however, the dial is set back beyond this limit switch determination, the other set of cams will be closed. In the illustration mentioned, this will cause closure of the switches 197 and 205 while the switches 204 and 196 are in neutral position. In this case, the stepping magnet circuit will be the same as if the limit switches had not operated, but the motor circuit will comprise bringing power from the line 249 through the switch 197 in its upper position, through the limit switch 80, the rotor 30, and then the contacts 94 and 96 of the limit switch 81 to ground. This renders the return circuit of the motor independent of the position of the switch 196 until the motor is moved to permit reclosure of the limit switch 81. When such closure takes place, it occurs with a snap-action and the motor will continue operation with the conventional circuit until the shaft 135 is returned to neutral position.

What is claimed is:

1. In a mechanism of the kind described, a driven shaft, a motor for driving said shaft, and means to determine the number of rotations of the shaft by controlling the number of rotations of the motor, said means comprising a control shaft adapted for movement toward and from a starting position, means to displace the shaft from starting position, a stepping magnet, an armature operated thereby, and means moved by movement of the armature to displace the shaft, for operating the control shaft in a return direction, means operated upon displacement of the control shaft away from starting position to effect energization of the motor, means likewise operated by displacement of the control shaft away from starting position for effecting a circuit for the stepping magnet, and means operated by the motor to make and break the stepping magnet circuit to effect periodical operation thereof to return the shaft to starting position; and said motor and stepping magnet circuit being deenergized when the control shaft returns to starting position.

2. In a mechanism of the kind described, a reversible motor, a switch means operated intermittently by the motor during operation thereof, a control means to preset the control a predetermined distance in either direction from a neutral position, two stepping magnet means, one for returning the control to neutral position from each direction of displacement, means in the control for determining which magnet means shall be energized, means in the control for effecting operation of the motor in one direction upon displacement of the control in a first direction, and means in the control for effecting operation of the motor in the reverse direction upon displacement of the control in the second direction, the switch means being adapted to control the stepping magnet means to effect a predetermined number of operations thereof per revolution of the motor, whereby the direction and number of revolutions of the motor may be determined by the displacement of the control.

3. In a mechanism of the kind described, a shunt wound reversible motor, switch means operated thereby a predetermined number of times per revolution of the motor, a control displaceable selected distances in either direction from a neutral position, means in the control to effect energization of the motor for rotation forward upon displacement of the control in a first direction, and for rotation backward upon displacement in the second direction, said means being adapted to stop operation of the motor when the control is in neutral position, a pair of stepping magnets, and mechanism operated by each magnet for acting upon the control to displace the same each time the magnet is impulsed, there being one such magnet and mechanism for returning the control to neutral position from each direction of displacement, the extent of displacement determining the number of impulses to the magnets required to effect such return, the control including means effecting a circuit for each stepping magnet when the control is displaced, and for breaking said circuits when the control is in neutral position, and said stepping magnet circuits including said switch means, whereby the magnets may be impulsed a predetermined number of times for each motor revolution.

4. In a mechanism of the kind described, a shunt wound reversible motor, switch means operated thereby a predetermined number of times per revolution of the motor, a control displaceable selected distances in either direction from a neutral position, means in the control to effect energization of the motor for rotation forward upon displacement of the control in a first direction, and for rotation backward upon displacement in the second direction, said means being adapted to stop operation of the motor when the control is in neutral position, a pair of stepping magnets, and mechanism operated by each magnet for acting upon the control to displace the same each time the magnet is impulsed, there being one such magnet and mechanism for returning the control to neutral position from each direction of displacement, the extent of displacement determining the number of impulses to the magnets required to effect such return, the control including means effecting a circuit for each stepping magnet when the control is displaced, and for breaking said circuits when the control is in neutral position, and said stepping magnet circuits including said switch means, whereby the magnets may be impulsed a predetermined number of times for each motor revolution, and means to prevent energization of a stepping magnet, upon displacement of the control, prior to starting of the motor.

5. In a mechanism of the kind described, a reversible motor, a forward circuit therefor, a reverse circuit therefor, a selector to close either circuit, said selector including a forward switch and means to shift the same from a first position to a second position when the selector is moved to forward position, and a reverse switch and means to shift the same from first to second position when the selector is moved to reverse position, the forward circuit including the forward switch in second position and the reverse switch in first position, and the reverse circuit including the reverse switch in second position and the forward switch in first position, and electrically operated means to return said selector to neutral position, and switch means causing said electrically operated means to operate when the selector is moved from neutral position and rendered inoperative when the selector is returned to neutral position.

6. In a mechanism of the kind described, a reversible motor, a forward circuit therefor, a reverse circuit therefor, a selector to close either circuit, said selector including a forward switch and means to shift the same from a first position to a second position when the selector is moved to forward position, and a reverse switch and means to shift the same from first to second position when the selector is moved to reverse position, the forward circuit including the forward switch in second position and the reverse switch in first position, and the reverse circuit including the reverse switch in second position and the forward switch in first position, and means to return said selector to neutral position, said means being caused to operate when the selector is moved from neutral position and rendered inoperative when the selector is returned to neutral position, said returning means including a forward return circuit and a reverse return circuit a forward return switch operated from first to second position when the selector is moved to a forward position, a reverse return switch operated from first to second position when the selector is moved to a reverse position, said forward return circuit including the forward in second position and the reverse return switch in first position, and said reverse return circuit including the reverse return switch in second position and the forward return switch in first position.

7. In a mechanism of the kind described, a motor, a control for determining the period of operation of the motor, said control including a control member and a preset member, the preset member being adapted to be moved from a starting position to a variable but selective position away from starting position, means causing the control member to be moved to restore the starting position, said means being responsive to power impulses and moved a given distance per power impulse, a circuit for the power-responsive means, a switch in the circuit, means operated by the motor to operate the switch a predetermined number of times for each rotation of the motor, means to prevent operation of the control during the presetting operation, comprising a switch in the control circuit, and means to open the switch during the presetting operation.

8. In a mechanism of the kind described, a motor, a control for determining the period of operation of the motor, said control including a control member and a preset member, the preset member being adapted to be moved from a starting position to a variable but selective position away from starting position, means causing the control member to be moved to restore the starting position, said means being responsive to power impulses and moved a given distance per power impulse, a circuit for the power-responsive means, a switch in the circuit, means operated by the motor to operate the switch a predetermined number of times for each rotation of the motor, means to prevent operation of the control during the presetting operation, said means comprising a relay coil and switch, the switch being in the control circuit, and means operated by operation of the preset member to energize the coil and open the relay switch in the control circuit.

9. In a mechanism of the kind described, a motor, a control for determining the period of operation of the motor, said control including a control member and a preset member, the preset member being adapted to be moved from a starting position to a variable but selective position away from starting position, means causing the control member to be moved to restore the starting position, said means being responsive to power impulses and moved a given distance per power impulse, a circuit for the power-responsive means, a switch in the circuit, means operated by the motor to operate the switch a predetermined number of times for each rotation of the motor, means to prevent operation of the control during the presetting operation, said means comprising a relay coil and switch, the switch being in the control circuit, means operated by operation of the preset member to energize the coil and open the relay switch in the control circuit, and a holding switch closed upon energization of the coil and shunting the power-responsive means in its circuit to maintain the coil energized through the said parallel circuit until the motor switch opens to deenergize the coil.

10. In a mechanism of the kind described, a reversible motor, a field winding and a rotor winding therefor, a forward circuit and a reverse circuit for the rotor winding, a control for determining the number of rotations of the motor, a forward limit switch operated after a maximum operation of the motor in a forward direction, a reverse limit switch operated after a maximum operation of the motor in a reverse direction, each limit switch having two poles and a single throw, the two motor circuits being interlocked and the control determining the direction of current flow therethrough from power source to return and each circuit including both limit switches in one position, and the limit switches being operable upon excess operation of the motor in their respective directions to short circuit the rotor circuits.

11. In a mechanism of the kind described, a motor, a control therefor, said control including a circuit for the motor, a reduction gearing in the motor, an operating shaft operated at reduced speed by the reduction gearing, said shaft having a threaded portion thereon, a nut on the threaded portion and movable from end to end thereof in accordance with the direction and number of rotations of the motor, limit switches in the motor circuit, and means movable by the nut when it approaches one end of the threaded portion to operate the limit switches and stop the motor, said means comprising a pivoted member disposed alongside the shaft with its pivot intermediate the ends of the shaft so that its ends may rock toward and from the shaft, the side of the pivoted member adjacent the shaft sloping outwardly from the pivot and toward the shaft to be engageable by the nut at the ends of its travel on the shaft, and means on the pivoted member to operate the limit switches when the pivoted member is rocked by the nut.

12. In a mechanism of the kind described, a motor, a control therefor, said control providing a circuit for the motor, a reduction gearing in the motor, an operating shaft operated at reduced speed by the reduction gearing, said shaft having a threaded portion thereon, a nut on the threaded portion and movable from end to end thereof in accordance with the direction and number of rotations of the motor, limit switches in the motor circuit, means movable by the nut when it approaches one end of the threaded portion to operate the limit switch and stop the motor, said means comprising a pivoted member disposed alongside the shaft with its pivot intermediate the ends of the shaft so that its ends may rock toward and from the shaft, the side of the pivoted member adjacent the shaft sloping outwardly from the pivot and toward the shaft to be engageable by the nut at the ends of its travel on the shaft, means on the pivoted member to operate the limit switches when the pivoted member is rocked by the nut, and means to preset the limit switches relative to the pivoted member to adjust the position on the threaded portion reached by the nut when the limit switches are shifted.

13. In a mechanism of the kind described, a control including a shaft displaceable in opposite directions, electrical means to return the shaft to starting position, a cam on the shaft, a pair of oppositely facing rises on the cam, a follower for each rise, said followers being off the rises when the shaft is in starting position, and only one of them being displaced upon a rise when the shaft is displaced in either direction, a switch operated by each follower, one switch being adapted to control the return means to effect return of the shaft in one direction, and the second being adapted to control the return means to effect return of the shaft in the other direction, a reversible motor adapted to be controlled in its operation by the control, third and fourth switches, one being operated by each follower, a forward circuit for the motor, a reverse circuit for the motor, the third switch being adapted to control the forward circuit for the motor, and the fourth switch being adapted to control the reverse circuit for the motor.

14. In a mechanism of the kind described, a control including a shaft displaceable in opposite directions, electrical means to return the shaft to starting position, a cam on the shaft, a pair of oppositely facing rises on the cam, a follower for each rise, said followers being off the rises when the shaft is in starting position, and only one of them being displaced upon a rise when the shaft is displaced in either direction, a switch operated by each follower, one switch being adapted to control the return means to effect return of the shaft in one direction, and the second being adapted to control the return means to effect return of the shaft in the other direction, said return means comprising a toothed member and electrical means engageable with the teeth thereof to return the same to starting position, said toothed member being secured to the shaft, a setting member rotatable concentrically with the shaft, and axially displaceable relative to the shaft, engaging means for connecting the toothed and setting members upon axial displacement of the latter, whereby rotation of the setting member will effect rotation of the shaft, and means to hold the setting member in position to which it is rotated, upon disengagement of the engaging means.

15. In a mechanism of the kind described, a control including a shaft displaceable in opposite directions, electrical means to return the shaft to starting position, a cam on the shaft, a pair of oppositely facing rises on the cam, a follower for each rise, said followers being off the rises when the shaft is in starting position, and only one of them being displaced upon a rise when the shaft is displaced in either direction, a switch operated by each follower, one switch being adapted to control the return means to effect return of the shaft in one direction, and the second being adapted to control the return means to effect return of the shaft in the other direction, said return means comprising a toothed member and electrical means engageable with the teeth thereof to return the same to starting position, said toothed member being secured to the shaft, a setting member rotatable concentrically with the shaft, and axially displaceable relative to the shaft, engaging means for connecting the toothed and setting members upon axial displacement of the latter, whereby rotation of the setting member will effect rotation of the shaft, and means to hold the setting member in position to which it is rotated, upon disengagement of the engaging means, a dial on the setting means, a fixed pointer for indicating the position to which the dial has been rotated, and a second pointer secured to the shaft and registering with the dial to indicate the position of the shaft relative to the dial.

16. In a mechanism of the kind described, a control including a shaft displaceable in opposite directions, electrical means to return the shaft to starting position, a cam on the shaft, a pair of oppositely facing rises on the cam, a follower for each rise, said followers being off the rises when the shaft is in starting position, and only one of them being displaced upon a rise when the shaft is displaced in either direction, a switch operated by each follower, one switch being adapted to control the return means to effect return of the shaft in one direction, and the second being adapted to control the return means to effect return of the shaft in the other direction, a reversible motor adapted to be controlled in its operation by the control, third and fourth switches, one being operated by each follower, a forward circuit for the motor, a reverse circuit for the motor, the third switch being adapted to control the forward circuit for the motor, and the fourth switch being adapted to control the reverse circuit for the motor, said return means comprising a toothed member and electrical means engageable with the teeth thereof to return the same to starting position, said toothed member being secured to the shaft, a setting member rotatable concentrically with the shaft, and axially displaceable relative to the shaft, engaging means for connecting the toothed and setting members upon axial displacement of the latter, whereby rotation of the setting member will effect rotation of the shaft, and means to hold the setting member in position to which it is rotated, upon disengagement of the engaging means, a member displaceable axially relative to the shaft, a fifth switch operated by displacement of said member from a first to a second position, said fifth switch in first position being adapted to admit power to either motor circuit, and in its second position to ground the motor circuits.

17. In a mechanism of the kind described, a control including a shaft displaceable in opposite directions, electrical means to return the shaft to starting position, a cam on the shaft, a pair of oppositely facing rises on the cam, a follower for each rise, said followers being off the rises when the shaft is in starting position, and only one of them being displaced upon a rise when the shaft is displaced in either direction, a switch operated by each follower, one switch being adapted to control the return means to effect return of the shaft in one direction, and the second being adapted to control the return means to effect return of the shaft in the other direction, a reversible motor adapted to be controlled in its operation by the control, third and fourth switches, one being operated by each follower, a forward circuit for the motor, a reverse circuit for the motor, the third switch being adapted to control the forward circuit for the motor, and the fourth switch being adapted to control the reverse circuit for the motor, said return means comprising a toothed member and electrical means engageable with the teeth thereof to return the same to starting position, said toothed member being secured to the shaft, a setting member rotatable concentrically with the shaft, and axially displaceable relative to the shaft, engaging means for connecting the toothed and setting members upon axial displacement of the latter, whereby rotation of the setting member will effect rotation of the shaft, and means to hold the setting member in position to which it is rotated, upon disengagement of the engaging means, a member displaceable axially relative to the shaft, a fifth switch operated by displacement of said member from a first to a second position, said fifth switch in first position being adapted to admit power to either motor circuit, and in its second position to ground the motor circuits, and a sixth switch closed upon displacement of the axially displaceable member, a relay for controlling energization of the return means circuits, and said sixth switch being adapted to control energization of the relay, and a relay switch in said return means circuits opened upon energization of the relay.

18. A control device of the character described, comprising a mounting frame; a two direction selective adjustment means carried on the forward end of the frame, comprising a rotatable knob assembly, means normally locking the assembly against rotation in the frame and disengageable upon limited axial movement of the assembly in said frame, a main switch mounted on the frame and connected in an electrical control circuit; and an axially shiftable shaft supported on the frame with one end disposed in operative engagement with the switch, said shaft being adapted to assume either of two axial positions of adjustment and adapted in one position to have its other end positioned to be engaged by the knob assembly, incident to such limited axial movement of the latter, for axially shifting the shaft to its other position of adjustment for effecting actuation of said switch.

19. A preselector for controlling the movement and positioning of electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; means under control of said gear and operable, upon completion of adjustment of said adjustment means for rendering operative a corresponding pair of switches of one of said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and electrically operated control means connected in circuit with said magnets for insuring and maintaining correspondence in positioning of said apparatus with said preselected adjustment of the adjustment means.

20. A preselector for controlling the movement and positioning of electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet, and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; means under control of said gear and operable, upon completion of adjustment of said adjustment means for rendering operative a corresponding pair of switches of one of said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and electrically operated control means connected in circuit with said magnets for insuring and maintaining exact correspondence in positioning of said apparatus with said preselected adjustment of the adjustment means, said last mentioned control means comprising a relay, and a normally open switch connected in circuit with the coil of the relay and adapted to be closed incident to adjusting movement of the adjustment means for maintaining correspondence in movement of the stepper gear and the apparatus being controlled.

21. A preselector for controlling the movement and positioning of electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; means under control of said gear and operable, upon completion of adjustment of said adjustment means for rendering operative a corresponding pair of switches of one of said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and electrically operated control means connected in circuit with said magnets for insuring and maintaining exact correspondence in positioning of said apparatus with said preselected adjustment of the adjustment means, said last-mentioned means comprising a relay, a normally open switch connected in circuit with the coil of the relay and adapted to be closed incident to adjusting movement of the adjustment means for temporarily opening the circuit including said magnets for maintaining correspondence in movement of the stepper gear and the apparatus being controlled, and a switch connected in said branch circuits for the power operated apparatus and adapted to open said branch circuits incident to adjusting movement of said adjusting means.

22. A preselector for controlling the movement and positioning of electric power operated apparatus within a predetermined range of movement, comprising a mounting frame; a two direction stepper mechanism mounted on the frame and comprising a rotatable stepper gear adapted to normally assume a zero starting position, a pair of electromagnets adapted to be selectively operated by impulses of electric current and stepper fingers associated with said magnets for operating said gear in step-by-step manner; a dual set of normally open switch means for each electromagnet mounted on said frame, each of said switch means including a switch in circuit with a corresponding magnet and a switch in circuit with the power operated apparatus; a two direction selective adjustment means adapted to be moved from a zero starting position to a position corresponding to a position to be assumed by said apparatus, within its range of movement; disengageable driving connections for causing rotative movement of said gear to a position in correspondence to the adjusting movement of said adjustment means; means under control of said gear and operable, upon completion of adjustment of said adjustment means for rendering operative a corresponding pair of switches of one of said dual set of switch means, to complete two branch electric circuits to a corresponding electromagnet and said power operated apparatus to cause said electromagnet to move said gear in step-by-step manner to its zero starting position and simultaneously cause said apparatus to be moved in synchronism with said gear to a preselected position of adjustment, said last mentioned means being responsive to the movement of said gear and adapted when said gear arrives at its zero starting position to cause opening of said two switches for breaking the electric circuits to said corresponding magnet and said power operated apparatus; and electrically operated control means connected in circuit with said magnets for insuring and maintaining exact correspondence in positioning of said apparatus with said preselected adjustment of the adjustment means, said last-mentioned means comprising a relay, a normally open switch connected in circuit with the coil of the relay and adapted to be closed incident to adjusting movement of the adjusting means for temporarily opening the circuit including said magnets for maintaining correspondence in movement of the stepper gear and the apparatus being controlled, and a switch connected in said branch circuits for the power operated apparatus and adapted to open said branch circuits incident to adjusting movement of said adjusting means, said last mentioned switch and the switch connected in circuit with said relay being positioned relatively to each other for causing actuation of one incident to actuation by the other.

23. A preselector for controlling the movement and positioning of remotely located electric power operated apparatus within a predetermined range of movement, comprising a mounting frame; a two direction stepper mechanism mounted on the frame and adapted to be operated by pulsations of electric current, and comprising a rotary stepper gear normally disposed in a zero starting position; a two direction selective adjustment means carried on the frame and adapted to be moved from a zero starting position, in either direction, to a position corresponding to a position to which said apparatus is to be moved, within its range of movement; said adjusting means and gear including disengageable interconnections to cause movement of said gear incident to adjustment of said adjusting means; and means on the frame, including means operably connected to said gear, and rendered operable incident to completion of adjustment of said adjustment means for completing interconnected electric control circuits for operating said stepper gear to assume its zero starting position and simultaneously moving said apparatus to a position, within its range of movement, corresponding to the said adjustment of said selective adjustment means.

24. A preselector for controlling the movement and positioning of remotely located electric power operated apparatus within a predetermined range of movement, comprising a mounting frame; a two direction stepper mechanism mounted on the frame and adapted to be operated by pulsations of electric current, and comprising a rotary stepper gear normally disposed in a zero starting position; a two direction selective adjustment means carried on the frame and adapted to be moved from a zero starting position, in either direction, to a position corresponding to a position to which said apparatus is to be moved, within its range of movement; said adjusting means and gear including disengageable interconnections to cause movement of said gear incident to adjustment of said adjusting means; means on the frame, including means operably connected to said gear, and rendered operable incident to completion of adjustment of said adjustment means for completing interconnected electric control circuits for operating said stepper gear to assume its zero starting position and simultaneously moving said apparatus to a position, within its range of movement, corresponding to the said adjustment of said selective adjustment means, a graduated scale and index means associated with said adjustment means and the frame to visually indicate the position of adjustment to be assumed by said apparatus, within its range of movement; and means rigidly associated and movable with said stepper gear including an indicating feature for cooperating with said scale and index means to visually indicate at all times the exact position of adjustment of said gear.

25. A preselector for controlling the movement and positioning of remotely located electric power operated apparatus within a predetermined range of movement, comprising a mounting frame; a two direction stepper mechanism mounted on the frame and adapted to be operated by pulsations of electric current, and comprising a rotary stepper gear normally disposed in a zero starting position; a two direction selective adjustment means carried on the frame and adapted to be moved from a zero starting position, in either direction, to a position corresponding to a position to which said apparatus is to be moved, within its range of movement; said adjusting means and gear including disengageable interconnections to cause movement of said gear incident to adjustment of said adjusting means; and means on the frame, including means operably connected to said gear, and rendered operable incident to completion of adjustment of said adjustment means for completing interconnected electric control circuits for operating said stepper gear to assume its zero starting position and simultaneously moving said apparatus to a position, within its range of movement, corresponding to the said adjustment of said selective adjustment means, said last mentioned means including a control cam movable with said gear and adapted to render said circuits inoperative when said gear returns to its zero starting position, and simultaneously arresting said apparatus at a position corresponding to the position of adjustment of said adjustment means.

26. A preselector for controlling the movement and positioning of remotely located electric power operated apparatus within a predetermined range of movement, comprising a mounting frame; a two direction stepper mechanism mounted on the frame and adapted to be operated selectively by pulsations of electric current, and comprising a rotary stepper gear normally disposed at a zero starting position; a two direction selective adjustment means carried on the frame, comprising a rotatable knob assembly mounted coaxially with the stepper gear, and index means associated with the knob assembly and frame, said knob assembly and a portion of the index means being axially shiftable toward and away from said stepper gear and rotatable in either direction, when shifted toward said stepper gear, from a zero starting position to a preselected position corresponding to a position to which said apparatus is to be moved, within its range of movement; driving connections for causing locking engagement of said knob assembly and stepper gear incident to axial movement of said knob assembly for effecting rotative adjustment of the stepper gear incident to rotation of the knob assembly to a predetermined position; spring means for axially shifting said knob assembly to disengage said driving connections with the stepper gear; and means carried by the frame and connected to said stepper gear and operable, when said stepper gear is moved to an adjusted position and is disengaged from the knob assembly, for completing interconnected electric control circuits for moving said stepper gear to its zero starting position and simultaneously moving said apparatus to a position, within its range of movement, corresponding to the position of adjustment imparted to said stepper gear by said knob assembly.

27. A preselector for controlling the movement and positioning of remotely located electric power operated apparatus within a predetermined range of movement, comprising a mounting frame; a two direction stepper mechanism carried on the frame and adapted to be selectively operated by pulsations of electric current, and comprising a rotary stepper gear normally disposed at a zero starting position; a two direction selective adjustment means carried on the frame, comprising a rotatable knob assembly, and a selector gear mounted coaxially with the stepper gear, and index means associated with the knob assembly and frame, said knob assembly and selector gear being axially shiftable toward the stepper gear and rotatable in either direction, in such shifted position, from a zero starting position to a preselected position corresponding to a position to be assumed by said apparatus, within its range of movement; locking means on the frame engageable with said selector gear to normally preclude rotation thereof and the knob assembly, and disengageable upon axial movement of said knob assembly and selector gear toward said stepper gear to permit rotative adjustment thereof; driving means for interconnecting said gears in such shifted position whereby said stepper gear is caused to be rotated with the selector gear to a preselected position; spring means for urging the knob assembly and selector gear to its outer position to disengage said driving means, means carried by the frame and connected to said stepper gear for rotation therewith and adapted when the stepper gear is disengaged from the selector gear for completing interconnected electric control circuits for moving said stepper gear to its zero starting position and simultaneously moving said apparatus to a position, within its range of movement, corresponding to the preselected position of adjustment of said knob assembly, said last mentioned means being constructed and arranged to open said interconnected circuits when said stepper gear arrives at its zero starting position, and simultaneously arresting said apparatus at its preselected position of adjustment; and a main switch connected in said control circuits adapted to be moved to open position incident to axial movement of the knob assembly toward the stepper gear and adapted to assume a closed position after said knob assembly is moved axially away from the stepper gear.

28. A preselector for controlling the movement and positioning of remotely located electric power operated apparatus within a predetermined range of movement, comprising a mounting frame; a two direction stepper mechanism carried on the frame and adapted to be selectively operated by pulsations of electric current, and comprising a rotary stepper gear normally disposed at a zero starting position; a two direction selective adjustment mean carried on the frame, comprising a rotatable knob assembly, and a selector gear mounted coaxially with the stepper gear, and index means associated with the knob assembly and frame, said knob assembly and selector gear being axially shiftable toward the stepper gear and rotatable in either direction, in such shifted position, from a zero starting position to a preselected position corresponding to a position to be assumed by said apparatus, within its range of movement; driving means for interconnecting said gears in such shifted position whereby said stepper gear is caused to be rotated with the selector gear to a preselected position; spring means for urging the knob assembly and selector gear to its outer position to disengage said driving means; a spring-pressed detent engaging the teeth of said stepper gear to insure uniform step-by-step actuation; and means carried by the frame and connected to said stepper gear for rotation therewith and adapted when the stepper gear is disengaged from the selector gear for completing interconnected electric control circuits for moving said stepper gear to its zero starting position and simultaneously moving said apparatus to a position, within its range of movement, corresponding to the preselected position of adjustment of said knob assembly.

CLINTON H. DEDERICK.

REFERENCES CITED

The following references are of record in the file of this patent:

UNITED STATES PATENTS

| Number | Name | Date |
|---|---|---|
| 613,869 | Russell | Nov. 8, 1898 |
| 835,382 | Willard | Nov. 6, 1906 |
| 999,947 | Barnum | Aug. 8, 1911 |
| 1,304,269 | Dawson et al. | May 20, 1919 |
| 1,311,784 | White | July 29, 1919 |
| 1,508,796 | Kaminski | Sept. 16, 1924 |
| 1,610,080 | Eaton | Dec. 7, 1926 |
| 1,725,772 | Waite et al. | Aug. 27, 1929 |
| 1,728,759 | Higbee | Sept. 17, 1929 |
| 1,782,907 | Nielsen | Nov. 25, 1930 |
| 2,069,516 | Baker | Feb. 2, 1937 |
| 2,090,812 | Schmitt | Aug. 24, 1937 |
| 2,332,985 | Bullen | Oct. 26, 1943 |
| 2,355,381 | Lear | Aug. 8, 1944 |

FOREIGN PATENTS

| Number | Country | Date |
|---|---|---|
| 452,872 | France | May 24, 1913 |